March 18, 1924.                G. SIFKOVITZ                1,487,404
DEMOUNTABLE RIM
Filed Oct. 16, 1920    2 Sheets-Sheet 1
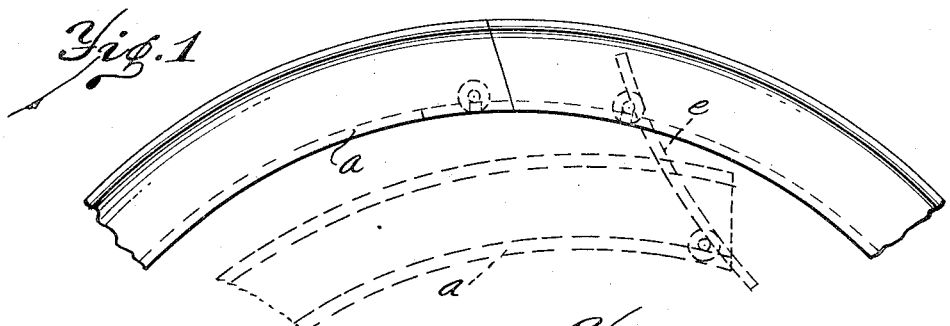
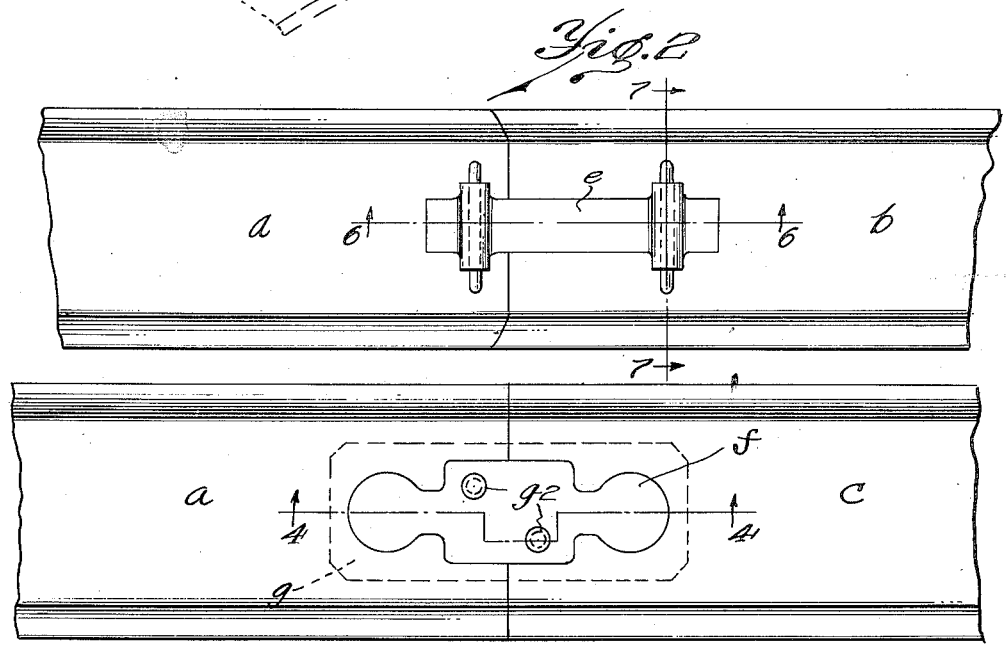
INVENTOR.
GEORGE SIFKOVITZ
BY
Ralzmond A. Parker
ATTORNEY.

March 18, 1924. 1,487,404
G. SIFKOVITZ
DEMOUNTABLE RIM
Filed Oct. 16, 1920   2 Sheets-Sheet 2
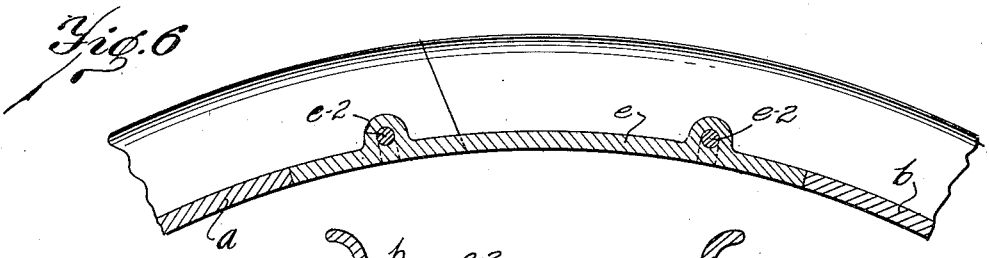
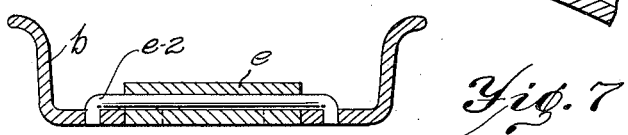
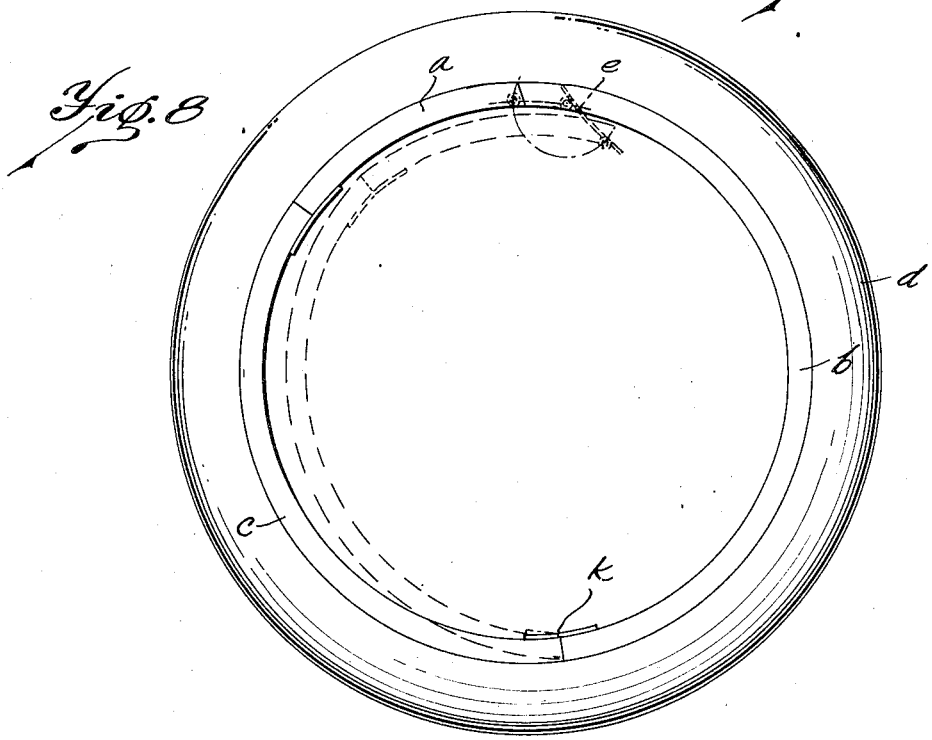
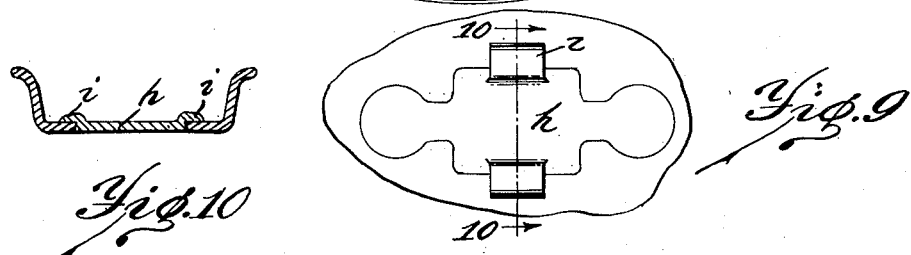
INVENTOR.
GEORGE SIFKOVITZ
BY
Ralzemond A. Parker
ATTORNEY.

Patented Mar. 18, 1924.

1,487,404

UNITED STATES PATENT OFFICE.

GEORGE SIFKOVITZ, OF PONTIAC, MICHIGAN, ASSIGNOR TO THE QUICK CHANGE AUTO RIM COMPANY, OF DETROIT, MICHIGAN, A CORPORATION OF MICHIGAN.

DEMOUNTABLE RIM.

Application filed October 16, 1920. Serial No. 417,339.

*To all whom it may concern:*

Be it known that I, GEORGE SIFKOVITZ, citizen of the United States, residing at Pontiac, county of Oakland, State of Michigan, have invented a certain new and useful Improvement in Demountable Rims, and declare the following to be a full, clear, and exact description of the same, such as will enable others skilled in the art to which it pertains to make and use the same, reference being had to the accompanying drawings, which form a part of this specification.

My invention relates to demountable rims of the collapsible type adapted to be easily and quickly removed or secured to the supported tire. It is particularly adapted for use with pneumatic tires of automotive vehicles.

The object is to provide a simple, inexpensive rim adapted to be easily and quickly removed from the tire by collapsing the rim and which rim may be easily and quickly expanded back into place relative the tire.

Demounting of the tire from the rim may be accomplished by a blow given the tire opposite the hinged segment of the rim, thereby throwing the hinged segment inwardly and collapsing the rim, and the rim may be expanded to its position relative the tire by inserting the same within the tire and with the foot or hand forcing the hinged segment of the rim back into position, as will more fully appear in the specification and claims.

In the drawings,—

Figure 1 is a fragmentary elevation showing the rigid link member connecting the meeting ends of separate segments of the rim.

Fig. 2 is a plan of the same view shown in Fig. 1.

Fig. 3 is a plan of the connection between the opposite end of the hinged segment and the meeting end of the adjacent rim section.

Fig. 4 is a section taken on line 4—4 of Fig. 3.

Fig. 5 is a perspective of the flexible hinged connection.

Fig. 6 is a cross-section taken on the line 6—6 of Fig. 3.

Fig. 7 is a cross-section taken on the line 7—7 of Fig. 2.

Fig. 8 is an elevation of a tire showing the rim in position and collapsed as shown in dotted outline.

Fig. 9 is a fragmentary elevation of a modification of a flexible hinge connection.

Fig. 10 is a section taken on the line 10—10 of Fig. 9.

I provide a rim formed of a plurality of sections or segments, three being here shown, connected together at their ends to form the complete rim. One of the segments, preferably a short segment, is hinged in position at one end by means of a flexible hinge adapted to hold such segment yieldingly outwards so it will keep its position in the rim, the rim being expanded as shown in full lines in Fig. 8. It is possible, however, to bring force to bear on such short pivoted segment as to force the same inwardly, collapsing the rim, as shown in dotted outline in Fig. 8.

Let $a$, $b$ and $c$ indicate the three rim segments, $a$ being the short segment pivotally supported as above described. The tire is indicated as $d$.

The short segment $a$ is hinged at one end to the meeting end of the adjacent rim segment $b$ by means of a rigid link member $e$. This link $e$ is pivoted at one end to the segment $b$ by means of a pin $e^2$ in the manner shown in Figs. 2 and 3 and at the other end the link is pivotally connected with segment $a$ in a similar manner so as to permit free movement of the link with reference to the meeting ends of the adjacent rim segments it hinges together, as shown in Figs. 1 and 8 in dotted outline. The rim segments are cut away to receive this link which lies flush with the under surface of the rim which rests on the felloe band, the pin bearings only being raised above the surface of the rim on the outer surface which abuts the tire, as shown in Fig. 6. The ends of the link are rounded so as to swing easily within the section of the rim where it is pivoted so as to assume the position shown in dotted outline in Figs. 1 and 8.

The opposite end of the pivotally supported segment $a$ is connected with the meeting end of the adjacent rim segment $c$ by means of a flexible joint or spring hinge which is shown in Figs. 3, 4, and 5, comprising two pieces, a coupling piece $f$ beveled at the edges of the adjacent rim segments and being flush with such rim segments when the rim is expanded, such coupling being shaped to follow the curvature of the rim. A flat spring $g$ is secured to such coupling $f$ by means of rivets $g^2$ and lies adjacent the inner surface of the rim, overlapping the meeting ends of the adjacent rim segments and so shaped as to lie flat against the surface of the rim segments when the rim is expanded. When the rim is collapsed, however, such segments are bent inwardly from such joint as a hinge and the shape of this flat spring is such that the ends of the spring will bear against the adjacent rim segments, exerting tension along the entire length of the spring instead of only at its middle point. The spring $g$ is held firmly up against the under surface of the rim segments, the bevel edges of the coupling engaging with the bevel edges of the opening in the rim segments, as shown in Fig. 4.

In the smaller size of rim where there is not sufficient clearance between the rim and the felloe band or where it is so desired this spring connection may be made in one piece as shown in the modified form, Figs. 9 and 10. In this form the spring and coupling are in one piece $h$ and ears $i$ are provided to overlap the joint and the beveled edge of the piece $h$ engages with the beveled edge of the openings thru the rim and holds the same in place. This form is not considered to possess the strength of the previously described construction. It will be seen that this yielding spring hinge will have the effect of holding the segment $a$ yieldingly outward in its position in the expanded rim and therefore serves to hold the rim in its expanded relation and that the collapsing of the rim will be against the tension of this collapsible joint. However, when the rim has been collapsed sufficiently, or rather when the segment $a$ has been forced inwardly sufficiently for the link $e$ to pass the radius thru its pivot with the rim, the action of the spring will be such as to throw the link $e$ forward to the position shown in dotted lines in Figs. 1 and 8, thereby compelling the collapsing of the rim. The meeting ends of the segments $a$ and $b$, where the rigid link is used, are beveled so as to come together easily. It is apparent that when the rim is collapsed it may be easily removed from the tire or inserted within the tire.

All that is necessary to expand the rim is to bring pressure to bear upon the segment $a$, forcing it back toward its expanded position until the link again passes the radius thru its pivotal connection with the rim when the tension of the spring will snap the segment $a$ back into its expanded position.

In the operation of this device, if the rim carrying a tire is lifted a foot or two from the ground and dropped with force against the ground striking that portion of the tire adjacent the segment $a$ the blow will have the effect of collapsing the rim.

When the rim is again replaced within the tire the foot of the operator can be used to force the segment $a$ back toward its expanded position until the link has progressed far enough to be brought under control of the spring tension of the hinge connection of segment $a$ with segment $c$, when segment $a$ will be thrown back into position.

As a preferred form of construction, the joint $k$ between segments $b$ and $c$ might well be a spring joint similar to that described as existing between segments $a$ and $b$. It is not necessary that the rim be formed in more than two segments, but in order to provide greater flexibility three are here used. It will not be essential that this connection $k$ be of the spring type. A hinge type joint of any of the conventional forms now used in rims will be sufficient, but the flexible hinge connection would seem to be preferable.

What I claim is:

1. A collapsible demountable resilient rim comprising a main rim portion and a segment pivotally connected thereto to form with the main rim portion a complete rim structure, a resilient member disposed at the point of connection between said segment and the main rim member for normally maintaining said segment in an extended position and adapted to yield in the face of a sudden shock or abnormal pressure to collapse the segment, and a pivoted link connecting the free end of the segment with the main rim portion to permit an inward movement thereof.

2. A demountable collapsible rim, comprising a main rim portion and a segment pivoted thereto to form with said main rim portion a complete rim structure, means for pivoting the segment to the rim comprising a hinge member seated within apertures in said segment and rim member, a resilient element underlying the inner surface of a portion of said segment and said main rim member to normally retain the segment in an extended position in the absence of abnormal stresses, and means connecting the other end of the segment with the main rim member.

3. A demountable rim split into segments, means for connecting the segments at one end comprising a coupling piece formed with connecting end portions, said coupling piece being seated within sockets in the ends of said rim sections and having beveled edges cooperating with oppositely beveled edges of the walls of the sockets and lying flush with the inner surface of the rim, means for holding said coupling piece in position, and a link pivoted at each end to opposite ends of said segments.

4. A demountable rim split into segments, means for connecting the segments at one end comprising a coupling piece formed with coupling head portions, said coupling piece being seated within sockets in the ends of said rim sections and having beveled edges cooperating with oppositely beveled edges of the walls of the sockets and lying flush with the inner and outer surface of said segments, a resilient member connected to the coupling piece and lying beneath the inner surface of the rim segments, and a link connecting the other end of said sections pivotally connected thereto.

In testimony whereof, I sign this specification.

GEORGE SIFKOVITZ.